United States Patent Office 2,938,857
Patented May 31, 1960

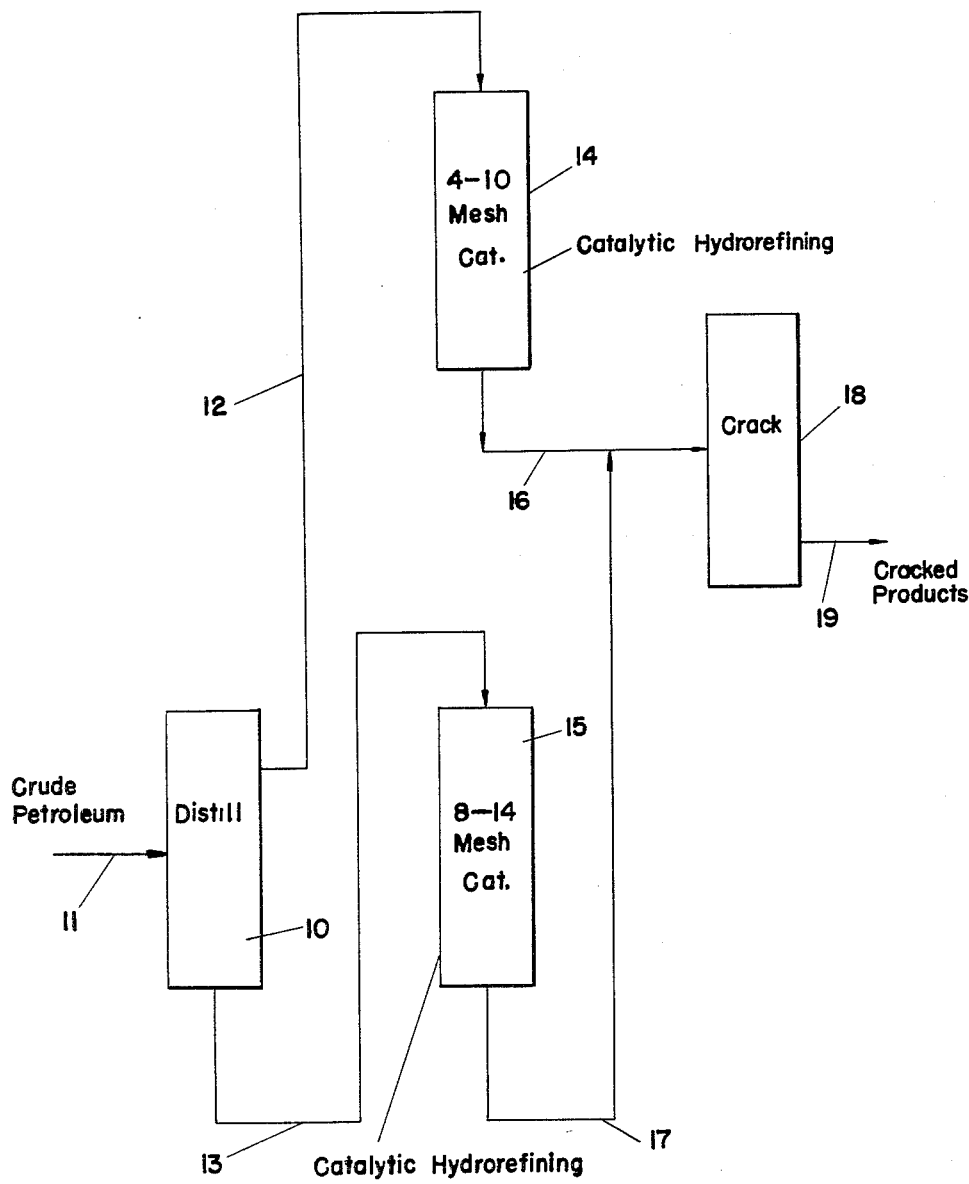

2,938,857

SPLIT HYDROREFINING OF FEED TO CATALYTIC CRACKING OPERATION

Herbert L. Johnson, Media, Henry E. Reif, Drexel Hill, and Abraham Schneider, Overbrook Hills, Pa., assignors to Sun Oil Company, Philadelphia, Pa., a corporation of New Jersey Filed Nov. 8, 1956, Ser. No. 621,080

2 Claims. (Cl. 208—89)

This invention relates to the hydrorefining of petroleum, and more particularly to a novel method of obtaining hydrorefined products with improved efficiency from a plurality of fractions including a residual fraction.

It is desirable to hydrorefine the heaviest components of crude petroleum, as well as constituents which are distillable therefrom, in order that the heaviest fractions can also be converted into suitable charge stock for catalytic cracking. The present invention provides a novel manner of obtaining optimum improvement of various fractions of crude petroleum with minimum size of plant installation.

It has been found that residual fractions from petroleum are more effectively hydrorefined by solid catalyst within a certain range of particle size than they are by larger catalyst particles. As shown subsequently in the examples, the reduction of Ramsbottom carbon content, sulfur content and metals content, etc. is significantly greater when catalyst having size within the range according to the invention is employed, as compared with the use of larger catalyst particles.

Although smaller catalyst particles are more effective in hydrorefining residual fractions, the difference in effectiveness of smaller and larger particles in the case of distillate fractions such as gas oil is frequently not sufficient to be a controlling factor in the choice of particle size.

The process according to the invention involves the separation of crude petroleum into a distillate fraction and a residual fraction, hydrorefining the distillate fraction with solid hydrogenation catalyst having particle size within the approximate range from 4 to 20 mesh (U.S. sieve series), and hydrorefining the residual fraction with solid hydrogenation catalyst having particle size within the approximate range from 8 to 40 mesh (U.S. sieve series), the average particle size of the latter catalyst being smaller than that of the former. The use of catalyst particles of different sizes in the hydrorefining of the distillate and residual fractions produces important benefits which cannot be obtained by hydrorefining both fratcions together in a single zone or by hydrorefining the two fractions in separate zones using the same sized catalysts in both zones.

The benefits derived from using different catalyst sizes in the respective hydrorefining operations include the following. The use of the smaller size catalyst in hydrorefining residual fractions results in more effective conversion of constituents of the fraction into desirable products than is obtained using larger catalyst particles. The use of the larger catalyst in hydrorefining the distillate fraction enables the use of larger ratios of petroleum to catalyst, thus reducing the size of plant which is required to hydrorefine a given amount of petroleum in a given time; these advantages are obtained while also obtaining satisfactory hydrorefining efficiency, since the large catalyst particles are sufficiently active in conversion of distallate constituents.

In preferred operation according to the invention, the hydrorefining of the distillate and residual fractions is carried out by passing each fraction downwardly through a stationary bed of solid hydrogenation catalyst. The liquid hourly space velocity is preferably within the approximate range from 0.2 to 6 volumes of petroleum per volume of catalyst bed per hour. The space rate in the case of the residual fraction is generally lower than the space rate for the distillate fraction, preferred space rates for the residual fraction being within the approximate range from 0.5 to 2, and for the distillate fraction within the approximate range from 1 to 6.

The process according to the invention provides superior results to those which can be obtained when the distillate and residual fractions are hydrorefined in the same zone, since in such latter hydrorefining a low space rate is required for the entire charge in order that sufficient conversion of the higher molecular weight constituents can be obtained. On the other hand, according to the invention, a residual fraction constituting for example 20% of the crude, can be hydrorefined at a space rate of one, while the remainder of the crude is hydrorefined at a space rate of two for example. The required plant size in the latter manner of operation is only ⅗ of the required plant size when the entire crude is hydrorefined at a space rate of one in order to obtain conversion of the higher molecular weight constituents of the crude comparing favorably with that obtained when hydrorefining a 20% residue at space rate of 1. Thus, according to the invention, a highly satisfactory conversion of the various fractions of the crude can be obtained with reduced plant size.

The use of the larger catalyst particles in the hydrorefining of the distillate fraction in the process according to the invention permits the use of higher space rates, as pointed out previously, and also provides important advantages with regard to reducing the pressure drop undergone by the distillate fraction in passing through the catalyst bed. The disadvantage of increased pressure drop resulting from the smaller size of the catalyst particles, on the other hand, is overbalanced in the case of the residual fraction, by the advantage of improved hydrorefining efficiency.

Any suitable hydrorefining conditions can be employed in the two hydrorefining operations according to the invention. Preferred temperatures are those within the approximate range from 600° F. to 925° F.; more preferred temperatures in the case of the residual fraction are those within the approximate range from 750° F. to 850° F., and for the distillate fraction those within the approximate range from 700° F. to 800° F. Preferred pressures are those within the approximate range from atmospheric to 5000 p.s.i.g., more preferably 500 p.s.i.g. to 4000 p.s.i.g. Preferably, the gases separated from the effluent hydrogenation product are recycled to the catalyst bed at a rate within the approximate range from 500 to 5000 standard cubic feet per barrel of charge.

Any suitable hydrogenation catalyst can be employed according to the invention. Examples of suitable catalysts are metals such as copper, zinc, mercury, tin, vanadium, tungsten, chromium, molybdenum, manganese, cobalt, iron, nickel, platinum, etc., oxides of such metals, sulfides of such metals or combinations of such metals or oxides or sulfides thereof. Any suitable catalyst support can be employed, e.g. activated carbon, alumina, aluminum silicates, bauxite, charcoal, clay, kieselguhr, magnesium, pumice, silica, silica-alumina compositions, etc.

The catalysts employed in the two hydrorefining zones may have the same composition; alternatively, catalysts of different compositions can be employed in the respective zones.

Although the invention has been previously described with reference to one distillate fraction and one residual fraction, it is to be understood that the original crude can be separated into any number of fractions, and any two or more of those fractions including a residual fraction can be hydrorefined according to the invention.

The invention will be more fully described in connection with the attached drawing, which is a schematic flowsheet of the operation according to one embodiment of the invention.

Referring to the drawing, crude petroleum is introduced through line 11 into distillation zone 10, wherein it is separated into a distillate fraction removed through line 12 and a residual fraction removed through line 13. The distillate fraction is hydrorefined in zone 14 by contact with a solid hydrogenation catalyst under hydrorefining conditions. The hydrorefining catalyst employed has particle size within the approximate range from 4 to 10 mesh. The residual fraction is hydrorefined in zone 15 by contact with 8 to 14 mesh catalyst under hydrorefining conditions. The hydrorefined products are removed from the respective zones through lines 16 and 17 respectively, and are introduced into catalytic cracking zone 18, wherein they are contacted with cracking catalyst under cracking conditions to produce conversion products which are removed through line 19.

The two hydrorefining operations reduce the Ramsbottom carbon content of the residual fraction and the sulfur metals content, etc. of both fractions. The reduction of nickel and vanadium content for example in the two hydrorefining operations is instrumental in improving both fractions for use as cracking stock, since nickel and vanadium have poisoning effects on the commonly used cracking catalyst such as silica-alumina compositions. The reduction of the Ramsbottom carbon content of the residual fraction is further instrumental in improving that fraction for use as cracking charge; thus, the hydrorefining of other residual fractions reduces the amount in such fraction of compounds which would tend to produce excessive coking in the cracking zone.

The use of 8 to 14 mesh catalyst in zone 15 produces superior results in the hydrorefining of residual fraction to those obtainable with larger catalyst particles. The use of 4 to 10 mesh catalyst in zone 14 provides satisfactory conversion of the distillate fraction, as compared with that obtainable with smaller catalyst, and is advantageous over the use of smaller catalyst in reducing the pressure drop of the distillate fraction in passing through zone 14, and in permitting the use of higher space rates in zone 14 than could satisfactorily be used with smaller catalyst particles.

The following examples illustrate the invention:

Example 1

A mixture of about 22% Kuwait crude, 21% Iraq crude and 57% Sweden crude was distilled to obtain a residual fraction constituting about 15% of the original mixture. The residual fraction contained mainly constituents of the Kuwait and Iraq crudes, since the Sweden crude contains only very small amounts of material having boiling points higher than the distillation temperature used in obtaining the residual fraction. The properties of the residual fraction are given subsequently in a table.

The total fraction was hydrorefined in two separate runs under essentially the same conditions, essentially the same hydrogenation catalyst being employed in each run, the catalyst have smaller particle size however in one run than in the other. The preparation of the smaller sized catalyst was as follows:

2256 parts of aluminum nitrate ($Al(NO_3)_3 \cdot 9H_2O$), 42.8 parts of cobalt nitrate ($Co(NO_3)_2 \cdot 6H_2O$) and 7.3 parts of zinc chloride ($ZnCl_2$, contained in solution of about 20 parts of hydrochloric acid) were dissolved in about 10,000 parts of hot water. To this solution was added, with stirring 563.4 parts of concentrated (25.3° Bé.) ammonium hydroxide containing in solution 40.6 parts of ammonium molybdate (($NH_4)_6Mo_7O_{24} \cdot 4H_2O$). About 350 parts of concentrated (30%) hydrogen peroxide was added with stirring. With continued stirring, about 720 parts of concentrated ammonium hydroxide was added to increase the pH of the solution to 9 and substantially complete the formation of the hydrogel.

The hydrogel-hydrogen peroxide composite was allowed to stand 1 hour and was then filtered. The separated hydrogel was slurried, by rapid mechanical agitation, with about 3200 parts of absolute methanol. The hydrogel was set by the contacting with methanol. After filtering, the precipitate was reslurried with a like quantity of absolute methanol and filtered. The filtered material was slurried with about 3200 parts water to remove any remaining water soluble salts, and filtered. The separated precipitate was dried by heating at 230° F. for 16 hours. The dried material was pulverized, mixed with water to form a dough and cast into pellets, which were dried for 16 hours at 400° F. and then calcined by heating to 1000° F. over a period of from 4 to 6 hours.

The resulting composition contained 3.1% cobalt oxide, 9.4% molybdenum oxide, 1.3% zinc oxide and 86.2% alumina.

The preparation of the larger sized catalyst was essentially the same as the preparation of the smaller size catalyst, except that the filtered material obtained from the water slurry was dried by heating at 400° F. for 2 hours, instead of heating at 230° F. for 16 hours. The result was a greater degree of dehydration, which resulted in less shrinkage of the catalyst pellets in the latter stages of the operation, thus resulting in larger sized catalyst particles.

The larger sized catalyst particles all passed through a 6 mesh screen and were retained on an 8 mesh screen. The smaller sized particles all passed through an 8 mesh screen, and all except a small amount, less than 5%, were retained on a 14 mesh screen.

Both hydrorefining runs were performed at a temperature of 800° F., 1500 p.s.i.g., and liquid hourly space velocity of one volume of charge per volume of catalyst bed per hour. The hydrogen to oil mole ratio was 22 in the case of the smaller catalyst and 21 in the case of the larger catalyst. The recycled gas rate was 5130 standard cubic feet per barrel in the case of the smaller catalyst and 5000 standard cubic feet per barrel in the case of the larger catalyst. The following table gives the properties for the charge stock and for the two hydrorefining products.

| | Residual Charge | Product | |
|---|---|---|---|
| | | 8 to 14 Mesh Catalyst | 6 to 8 Mesh Catalyst |
| A.P.I. Gravity, 60° F. | 11.4 | 18.1 | 16.0 |
| Ramsbottom Carbon Residue, Wt. Percent | 13.4 | 8.0 | 10.2 |
| Color, optical density at 525 millimicrons | 65,700 | 38,000 | 48,000 |
| Refractive Index, 20° C. | 1.5696 | 1.5450 | 1.5541 |
| Viscosity, Saybolt Universal, 210° F. | 553 | 80 | 98 |
| Elemental Analysis: | | | |
| Carbon, Wt. Percent | 84.97 | 86.13 | 85.44 |
| Hydrogen, Wt. Percent | 10.84 | 11.45 | 11.20 |
| H/C Atomic Ratio | 1.52 | 1.58 | 1.56 |
| Sulfur, Wt. Percent | 4.3 | 1.76 | 2.71 |
| Nitrogen, Wt. Percent | 0.31 | 0.26 | 0.25 |
| Nickel, p.p.m. | 30 | 6 | 17 |
| Vanadium, p.p.m. | 95 | 14 | 42 |

These results show that the 8 to 14 mesh catalyst produced more satisfactory conversion of undesirable constituents of the charge than did the 6 to 8 mesh catalyst.

The comparison of the two catalysts is shown more particularly in the following table.

|  | 8 to 14 Mesh | 6 to 8 Mesh |
|---|---|---|
| Percent Reduction in Ramsbottom Carbon | 40 | 24 |
| Percent Reduction in Color | 42 | 27 |
| Reduction in Refractive Index | 0.0246 | 0.0155 |
| Percent Reduction in Sulfur | 59 | 37 |
| Percent Reduction in Nitrogen | 16 | 19 |
| Hydrogen Consumed, s.c.f./bbl. of charge | 450 | 370 |

This example shows the improved results obtained with 8 to 14 mesh catalyst in the hydrorefining of a residual petroleum fraction.

*Example II*

In additional runs made with the same charge stock at 800° F., 1500 p.s.i.g., and space rate of 1, using a catalyst comprising about 2% cobalt oxide and about 8% molybdenum oxide on alumina, the following results were obtained with different batches of catalyst having the indicated particle size range:

|  | 10 to 30 Mesh | 4 to 6 Mesh |
|---|---|---|
| Percent Reduction in Ramsbottom Carbon | 43 | 24 |
| Percent Reduction in Color | 45 | 24 |
| Reduction in Refractive Index | 0.0287 | 0.0148 |
| Percent Reduction in Sulfur | 68 | 27 |
| Percent Reduction in Nitrogen | 19 | 19 |
| Hydrogen Consumed, s.c.f./bbl. of charge | 560 | 330 |

This example shows the improved results obtained with 10 to 30 mesh catalyst in the hydrorefining of residual petroleum fractions.

*Example III*

Ordonez crude petroleum is distilled to obtain a gas oil distillate fraction having A.P.I. gravity of about 22 and boiling in the approximate range from 650° F. to 1000° F. and a residue having A.P.I. gravity of about 11. The gas oil and residue are hydrorefined under conditions as shown in the following table:

|  | Gas oil | Residue |
|---|---|---|
| Temperature, ° F | 800 | 800. |
| Pressure, p.s.i.g | 1,500 | 1,500. |
| Space velocity | 4 | 1. |
| Catalyst composition | As in Example I. | As in Example I. |
| Catalyst size, mesh | 6 to 8 | 8 to 14. |
| H₂ to oil mole ratio | 4 | 20. |
| Recycled gas rate, s.c.f./bbl. of charge | 1,500 | 5,000. |

The gas oil hydrorefining products have optical density color of 79 as compared with 225 for the charge, refractive index of 1.4987 as compared with 1.5115 for the charge, hydrogen to carbon atomic ratio of 1.76 as compared with 1.69 for the charge, and sulfur and nitrogen contents of 0.81 and 0.06 weight percent, as compared with 2.20 and 0.09 weight percent respectively for the charge. The residue hydrorefining produces results generally similar to those described in Example I.

This example shows that highly satisfactory results with regard to throughput and product quality can be obtained by separating crude into distillate and residual fractions and hydrorefining the fractions using smaller catalyst in the case of the residual fraction.

The average size of catalyst particles employed in hydrorefining the distillate fraction is within the approximate range from 4 to 20 mesh. Preferably, less than 25 weight percent of the mixture of particles has size outside that range. The average particle size of catalyst particles employed in hydrorefining the residual fraction is within the approximate range from 8 to 40 mesh. Preferably, less than 25 weight percent of the mixture of particles has size outside that range. Preferably, the difference between the average particle size of the mixtures used in hydrorefining the distillate and residual fractions respectively is at least 0.5, and more preferably at least 1.0, mesh size unit on the U.S. sieve series scale.

The invention claimed is:

1. Process for hydrorefining petroleum which comprises separating crude petroleum into a distillate fraction and a residual fraction, contacting the distillate fraction under hydrorefining conditions with a solid hydrogenation catalyst having particle size within the approximate range from 4 to 20 mesh, contacting the residual fraction under hydrorefining conditions with a hydrogenation catalyst having particle size within the approximate range from 8 to 40 mesh, the average particle size of the latter catalyst being smaller than the average particle size of the first-named catalyst, and feeding the combined hydrorefined products to a catalytic cracking zone for cracking said products.

2. Process according to claim 1 wherein the first named hydrorefining conditions comprise temperature within the approximate range from 700 to 800° F., pressure within the approximate range from 500 to 4000 p.s.i.g. and liquid hourly space velocity within the approximate range from 1 to 6 volumes of liquid oil per volume of catalyst bed per hour, and wherein the second named hydrorefining conditions comprise temperature within the approximate range from 750 to 850° F., pressure within the approximate range from 500 to 4000 p.s.i.g. and liquid hourly space velocity within the approximate range from 0.5 to 2 volumes of oil per volume of catalyst bed per hour, the latter space velocity being lower than the first-named space velocity.

References Cited in the file of this patent

UNITED STATES PATENTS

| 2,078,946 | Houdry | May 4, 1937 |
| 2,355,366 | Conn | Aug. 8, 1944 |
| 2,431,920 | Cole | Dec. 2, 1947 |
| 2,487,466 | Nahin | Nov. 8, 1949 |
| 2,779,711 | Goretta | Jan. 29, 1957 |